United States Patent [19]
Sigmund

[11] 3,719,379
[45] March 6, 1973

[54] BACKREST LOCKING MECHANISM OF VEHICLE SEATS

[75] Inventor: Gerhard Sigmund, Stuttgart-Vaihingen, Germany

[73] Assignee: Daimler-Benz Aktiengesellschaft, Germany

[22] Filed: Sept. 22, 1970

[21] Appl. No.: 74,411

[30] Foreign Application Priority Data

Sept. 29, 1969 Germany...................P 19 49 085.8

[52] U.S. Cl. ................................................297/379
[51] Int. Cl. ................................................B60n 1/04
[58] Field of Search .....297/379, 378, 372, 363; 5/43

[56] References Cited

UNITED STATES PATENTS

| | | | |
|---|---|---|---|
| 3,342,527 | 9/1967 | Bencene | 297/379 |
| 3,001,821 | 9/1961 | Marechal | 297/379 X |
| 3,216,766 | 11/1965 | Tabor | 297/379 X |
| 3,262,725 | 7/1966 | Ballantyne | 297/379 X |
| 3,387,885 | 6/1968 | Boschen | 297/379 |
| 3,338,633 | 8/1967 | Jackson | 297/379 |
| 3,398,987 | 8/1968 | Lynn | 297/379 |
| 2,815,796 | 12/1957 | Lobanoff | 297/379 |
| 3,123,401 | 3/1964 | Komenda | 297/379 |
| 2,559,548 | 7/1951 | Seigneur | 297/379 X |
| 3,215,096 | 11/1965 | Holtz | 108/111 |

*Primary Examiner*—Francis K. Zugel
*Attorney*—Craig, Antonelli and Hill

[57] ABSTRACT

An installation for locking the backrest in seats of vehicles, particularly motor vehicles in which a forward tilting or pivoting of the backrest is prevented during the drive of the vehicle, by a disengagable locking mechanism; the locking mechanism includes clamping means preferably arranged at the inner side of two seat fittings supported at the seat frame which retain the backrest in the driving condition under a spring force in the rearwardly pivoted position whereas upon exceeding the spring force by a load acting on the backrest in the driving direction, a hook-like member supported on a pivot pin fastened at the fitting stops the backrest at a relatively fixed part such as a pin member or the like secured at the seat frame.

39 Claims, 6 Drawing Figures

INVENTOR
GERHARD SIGMUND

INVENTOR
GERHARD SIGMUND

BACKREST LOCKING MECHANISM OF VEHICLE SEATS

The present invention relates to a mechanism for a seat backrest locking mechanism in seats of vehicles, especially of motor vehicles, in which a forward tilting or pivoting of the backrest of the seat is prevented during the drive by a disengageable locking mechanism.

Vehicle seats are already known in the prior art in which a forward pivoting of the seat backrest is prevented during the drive by a locking mechanism. In these prior art vehicle seats a pivotal hook is supported on both sides of the backrest which engages over a bolt disposed at the seat frame. If the backrest is to be pivoted forwardly, the hooks are disengaged by means of a Bowden cable or a linkage. The hooks are disposed directly below the bolt in the locking position of the backrest and prevent any movement of the backrest during the drive. However, since a clearance-free engagement of the hooks is not possible for manufacturing reasons and the backrest is not loaded in a constant manner in its pivoted back position, a rattling, especially of the unoccupied seat alongside the driver-seat, cannot be avoided with this prior art solution of the backrest locking mechanism.

Another prior art seat backrest locking mechanism essentially consists in that the bolt secured at the seat frame runs up along an inclined edge of the hook. The hook is pressed with the inclined surface by relatively high spring forces against the bolt and thereby frees the seat backrest locking mechanism from rattles. A very considerable disadvantage of this prior art seat backrest locking mechanism resides in that very large spring forces have to be overcome for the disengagement of the hook. The unlocking of the backrest cannot take place by means of one hand so that the comfort for the vehicle passengers, especially during the boarding and leaving of the passengers seated in the back of the vehicle, is strongly impaired thereby. A further disadvantage essentially resides in that the Bowden cables subjected to a strong spring stress or load have a tendency to break in case of frequent use. The known seat backrest locking mechanism is additionally expensive by reason of large technical expenditures and prone to breakdown and troubles.

The present invention is concerned with the task to avoid the disadvantages of the known seat backrest locking mechanisms and to provide with the aid of a constructively simple solution, a safe seat backrest locking mechanism free of rattles which at the same time can be unlocked by slight actuating forces.

The underlying problems are solved according to the present invention in that clamping means are arranged, preferably at the inside of the two seat fittings mounted at the seat frame, which retain the seat backrest in the driving condition under spring stress in the rearwardly pivoted position whereas upon exceeding the spring force by a load acting on the backrest in the driving direction, a hook supported about a pivot pin or bolt secured at the fitting, stops the backrest of the seat at a bolt or pin fixedly arranged at the seat frame. It is for the first time achieved by this construction in a very advantageous manner that the rattle removal and the locking of the seat backrest take place as two separate functions.

A bending spring constructed in a curved manner and having several leg portions may serve as clamping means which is so arranged under prestress about the pivot bolt or pin of the hook secured at the fitting of the seat backrest and about a further bearing bolt also secured at the fitting of the seat backrest that during the locking in the driving condition, a leg portion of the bending spring engages the bolt fixedly arranged at the seat frame wedge-shaped from below whereas the other leg portion of the bending spring presses the inner flank of the hook against the bolt.

In order to retain the seat backrest also in case of an unloaded seat during the driving condition in the rear position thereof in a rattle-free manner and in order to keep small the unlocking forces for the disengagement of the hook, it is advantageous if the leg portion of the bending spring pressing against the bolt has a considerably larger spring constant than the leg portion of the bending spring secured at the angularly-shaped hook. The leg portion of the bending spring which engages the bolt wedge-shaped from below and has the larger spring constant may be turned in at its free end and may be provided with two butting surfaces disposed approximately at right angle to one another.

Whereas the leg portion of the bending spring having the larger spring constant exerts very large spring forces on the bolt fixedly secured at the seat frame and thus retains the seat backrest in the rearward position, the leg portion of the bending spring having the smaller spring constant, which is bent in the shape of a hairpin at its end connected with the hook and serves as return spring for the hook, exerts only a very small spring force on the hook. As a result thereof, the hook can be disengaged very easily by means of a Bowden cable so that the unlocking lever disposed at the upper backrest side can be actuated without difficulty by means of one hand. The spring forces of the bending spring are advantageously so dimensioned and selected that the unloaded seat backrest is retained in its rear position during the drive and the leg portion serving as return spring for the hook overcomes the friction of the Bowden cable or of the linkage and thereby eliminates rattles from the lightweight hook.

According to a very advantageous embodiment of the present invention a clamping bolt fixedly arranged at the seat frame and adjustable in its longitudinal axis may serve as clamping means which is provided at its end opposite the seat frame with a conically-shaped extension and partially engages into an armored aperture provided in the fitting. Whereas the seat backrest fittings are forced by the clamping bolt elastically toward the outside and the clamping bolt attempts to engage into the aperture of the fittings, the hook is pressed with its inner flank by means of a spiral spring secured at the pivot pin or bolt of the hook against the clamping bolt. Both with the use of the bending spring as also with the use of the clamping bolt the backrest secured at the fitting which rests on the bolt secured at the frame or on a ring mounted on the clamping bolt and is constituted by a bending spring abutment or by the pivot pin of the hook, assures that the backrest in the pivoted back position is able to support itself at the seat frame in the condition loaded by an operation and does not pivot back rearwardly beyond the bolt fixedly secured at the seat frame. It is achieved by an appropriate selection of the outer diameter of the pivot pin, of the hook and of the ring supported or mounted at the clamping bolt that the clamping bolt cannot engage completely in the aperture provided in the fitting so that, depending on the extension of the clamping bolt in its longitudinal axis, any desireable spring force caused by the outward pressing action of the seat backrest fittings is achieved. With small seat backrest pivot movements the inclined edge of the conically-shaped extension slides along the edge of the armored aperture in the fitting.

According to a further advantageous feature of the present invention the hook may be constructed angularly shaped or curved and may be provided at its end opposite the pivot pin with a nose portion partially surrounding the bolt or clamping bolt and having an external inclined abutment surface, which is held during locking in the driving condition at a predetermined distance under the bolt or clamping bolt. Upon exceeding the spring forces of the clamping means by a load of the backrest in the driving direction the nose portion of the angularly-shaped hook engages underneath the bolt or clamping bolt arranged at the seat frame and secures the backrest against a forward pivoting. In order to be able to unlock the hook, an unlocking Bowden cable may advantageously engage approximately at the outer flank of the hook which is actuatable by means of a lever or the like at the upper end of the seat backrest and which pivots the hook outwardly against the spring force of the return spring or spiral spring. Since the hook is characterized by an easy action of movement as a result of the very small spring forces acting on the same, an expensive lever arrangement for the transmission of the actuating forces is avoided so that structural parts and space can be economized.

It is advantageous if the pivoting of the hook is limited preferably in both pivot directions by abutments so that the outer inclined abutment surface of the nose portion of the hook is disposed above the bolt or clamping bolt in the unlocked condition of the backrest. A pin secured at the seat fitting or the backrest may serve as abutment which at the same time is able to absorb the spring force of the bending spring in the unlocked condition of the backrest. The abutments have the task to prevent that the hook in the unlocked condition is pivoted over the bolt secured at the seat frame so that the outer inclined abutment surface of the nose portion of the hook is no longer disposed above the bolt secured at the seat frame and, on the other, that the hook is pulled too far in the upward direction by the Bowden cable.

Accordingly, it is an object of the present invention to provide a seat backrest locking mechanism for vehicle seats which avoids by simple means the aforementioned shortcomings and drawbacks encountered in the prior art.

Another object of the present invention resides in a locking mechanism for the backrest of vehicle seats which is simple in construction, requires relatively few parts that can be easily manufactured and results in savings of space as well as cost.

A further object of the present invention resides in a backrest locking mechanism for vehicle seats, especially of motor vehicles which assures freedom from rattles of the seat even in the unoccupied condition yet requires relatively slight forces to unlock the seat in order to permit forward tilting.

Still another object of the present invention resides in a backrest locking mechanism of the type described above which considerably increases the comfort for the passengers as regards actuation and freedom from disturbing noises.

These and other objects, features and advantages of the present invention will become more obvious from the following description when taken in connection with the accompanying drawing which shows, for purposes of illustration only, two embodiments in accordance with the present invention, and wherein FIG. 1 is a somewhat schematic side elevational view, partially in cross-section, of a locking mechanism of a seat backrest with a bending spring in the locked condition free from rattles;

Figure 5:
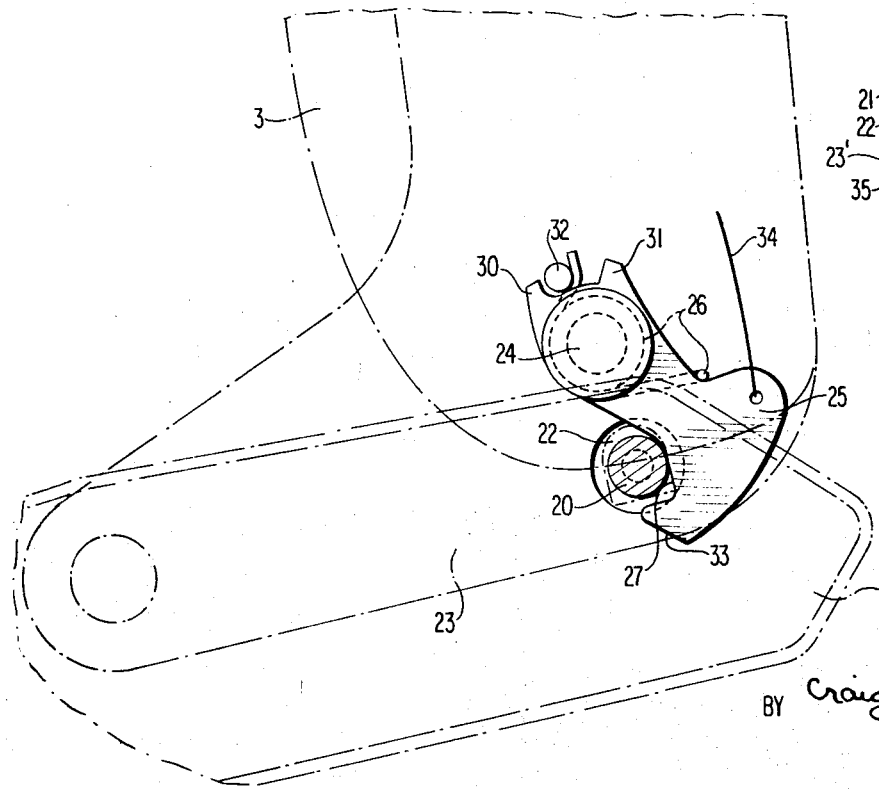
Figure 6:
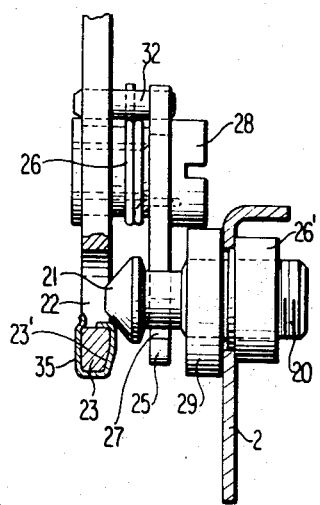

FIG. 5 is a somewhat schematic partial side elevational view, partly in cross-section, of a modified embodiment of a locking mechanism for a seat backrest with a clamping bolt in accordance with the present invention, and FIG. 6 is an elevational view of the locking mechanism of the seat backrest of FIG. 5 as seen in the driving direction and with some parts thereof broken away for the sake of better understanding.

Figure 1:
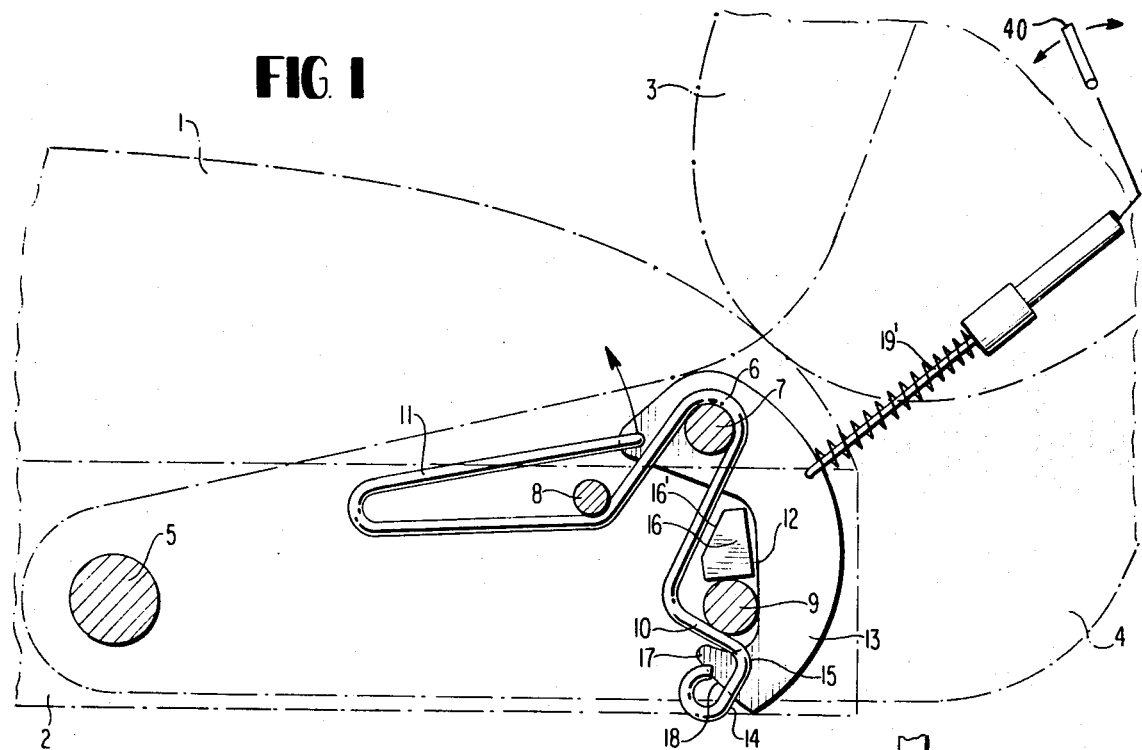

Referring now to the drawing wherein like reference numerals are used throughout the various views to designate like parts, and more particularly to FIG. 1, this figure shows schematically seat 1 with a seat frame 2 and a seat backrest 3. The backrest 3 is rotatably or pivotably supported at the seat-frame 2 of the seat by way of a conventional fitting 4 and a pivot pin or pivot bolt 5. For the sake of a better illustration of the locking mechanism the parts 1 to 4 normally covering the locking mechanism are indicated in dash and dot lines. In the embodiment of the locking mechanism according to FIG. 1 a curved bending spring 6 having several leg portions is provided as clamping means which retains the seat backrest 3 in the driving condition under spring force in the rearwardly pivoted position.

The clamping spring 6 is placed about a pivot pin 7 secured at a conventional fitting 4 of the seat backrest 3 and is held under prestress between a bearing bolt 8 secured at the fitting 4 of the seat backrest and a bolt or pin 9 fixedly arranged at the seat frame 2 in such a manner that during locking in the driving condition a leg portion 10 of the spring 6 engages the bolt or pin 9, fixedly arranged at the seat frame 2, wedge shaped from below whereas the other leg portion 11 of the spring 6 presses the inner flank 12 of a hook 13 against the bolt or pin 9. The spring constants of the bending spring 6 are so selected that the leg portion 10 of the spring 6 pressing against the bolt 9 has a considerably larger spring constant than the leg portion 11 of the spring 6 engaging at the angularly-shaped hook 13. The leg portion 10 of the spring 6 having the larger spring constant is turned in at its free end and includes two inclined abutment surfaces 14, 15, disposed approximately at right angle to each other. The leg portion 11 with the smaller spring constant of the spring 6 is bent at its end connected with the hook 13 in the shape of a hairpin and serves as return spring for the hook 13. It can be further seen from FIG. 1 that the backrest support 16 secured at the fitting 4 abuts during the driving condition against the pin 9 and is provided with an inclined surface 16' at the side facing the bending spring 6.

The hook 13 is constructed angularly shaped and includes at its end opposite the pivot pin 7 a nose portion 17 partially surrounding the bolt 9; the nose portion 17 is provided with an external abutment surface 18, which is held at a predetermined distance under the pin 9 in the driving condition when locked.

Figure 2:
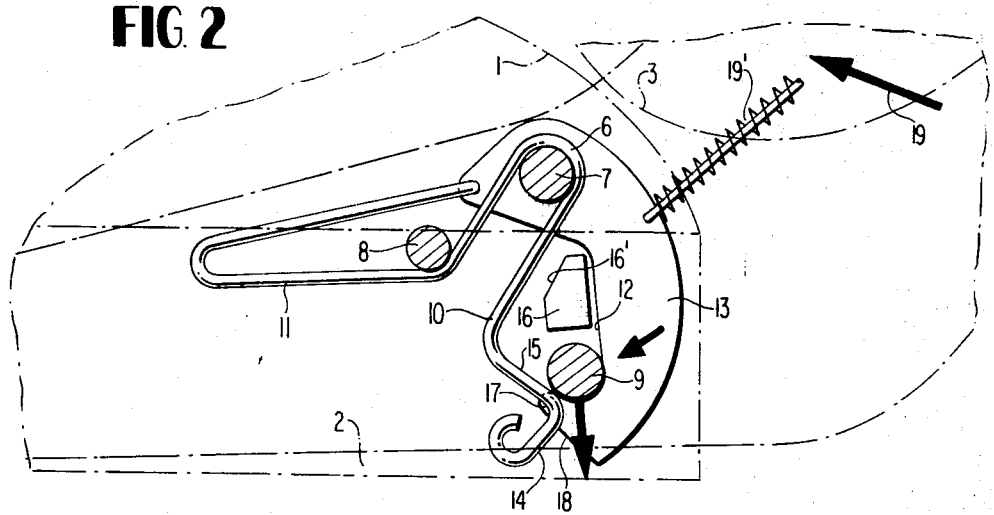
FIG. 2 is a somewhat schematic partial side elevational view, similar to FIG. 1, illustrating the locking mechanism for the seat backrest in the driving condition in case of a load thereon.

FIG. 2 illustrates the locking position when an impact load 19 acting in the driving direction acts on the backrest 3 of the seat 1. Upon exceeding the spring force of the bending spring 6, the nose portion 17 of the angularly-shaped hook engages directly at the bolt 9 from below and holds the backrest 3 at the frame 2 of the seat in the rearwardly pivoted position.

Figure 3:
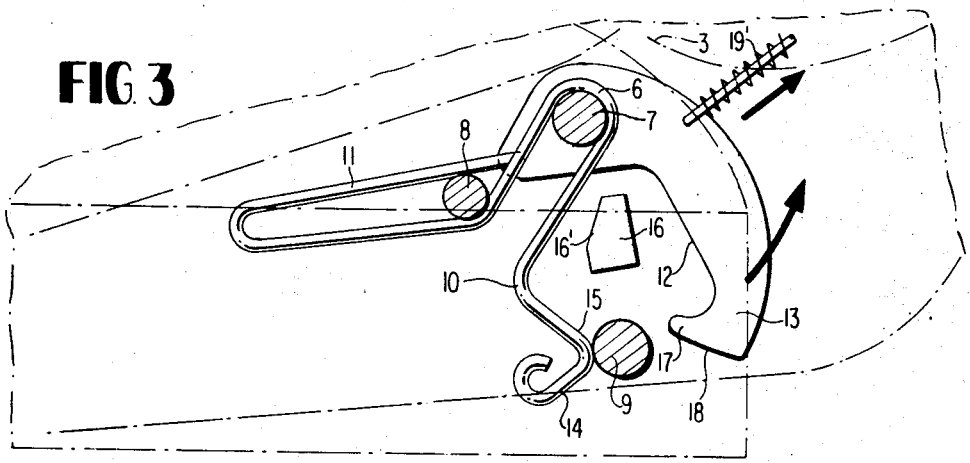
FIG. 3 is a somewhat schematic partial side elevational view, similar to FIGS. 1 and 2, illustrating the locking mechanism for the seat backrest during the disengaging operation.

FIG. 3 illustrates the mechanism during disengagement of the backrest. For this purpose an unlocking Bowden cable 19' is provided at the outer flank of the hook 13 which is adapted to be actuated by a slider (not shown) or by a small lever (not shown) at the upper end of the seat backrest and which pivots the hook 13 outwardly about pin 7 against the spring force of the return spring 11. The pivot movement is limited in that the return spring 11 abuts against the pin 8. Since the nose portion 17 of the hook 13 does not engage underneath the bolt 9 in the normal rest position of the backrest 3 as illustrated in FIG. 1, only the spring force of the return spring 11 has to be overcome for the unlocking operation so that an expensive lever arrangement for overcoming large spring forces is not necessary.

Figure 4:
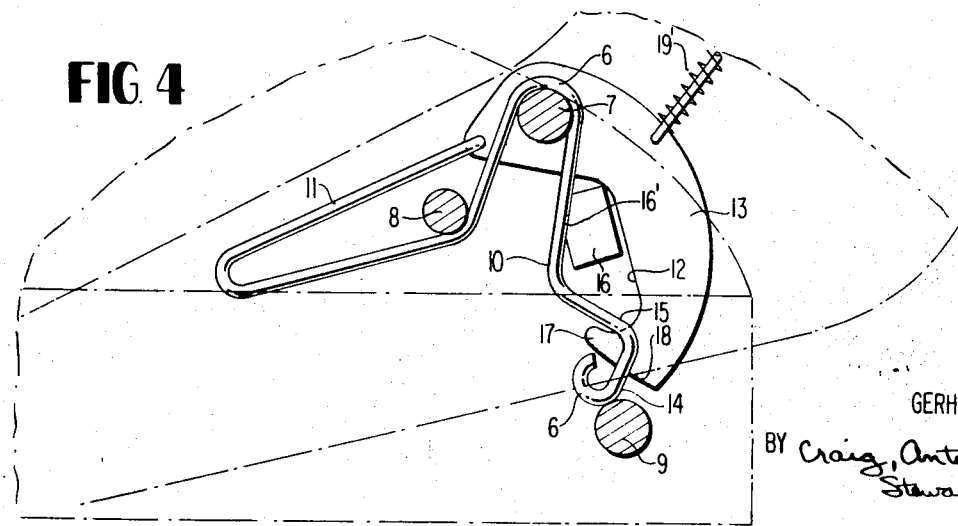
FIG. 4 is a somewhat schematic partial side elevational view, similar to FIGS. 1 to 3, illustrating the locking mechanism of the seat backrest in the unlocked condition with the backrest pivoted or tilted forwardly.

It is very appropriate if the pivoting of the hook 13 is limited preferably in both pivot directions by abutments in order that the outer inclined abutment surface 18 of the nose portion 17 of the hook 13 is disposed above the bolt 9 in the unlocked condition of the backrest (FIG. 4). The abutment surface 14 of the bending spring 6 and the abutment surface 18 of the hook 13 form in the unlocked condition of the backrest a funnel, into which engages or snaps the pin 9 during locking so that the bending spring 6 and the hook 13 are forced apart from one another.

Another embodiment of a locking mechanism according to the present invention is illustrated in FIGS. 5 and 6. In that case, a clamping bolt or pin 20 fixedly arranged at the seat frame 2 and adjustable in the direction of its longitudinal axis serves as clamping means which is provided at its end opposite the seat frame 2 with a conically-shaped extension 21 and partially engages into an armored aperture 22 provided in the fitting 23. A spiral spring 26 is secured at the pivot pin 24 of the hook 25, which engages over the hook 25 and presses the hook 25 with its inner flank 27 against the clamping bolt 20. It can be seen from FIG. 6 that the clamping bolt 20 is secured at the frame 2 by means of a nut 26' and can be adjusted in the direction of its longitudinal axis. Since the clamping bolt 20 attempts to engage in the aperture 22 of the fitting 23 whereby the conical surface of the extension 21 favors an engagement, the seat backrest is held in its rearward position under stress in such a manner that a slight forward tilting of the seat backrest and therewith the commencement of the function of the hook is caused only under a relatively larger load on the backrest in the driving direction. In that case the nose portion 27 of the hook 25 abuts against the clamping bolt 20 and secures the backrest 3 against a forward pivoting or tilting. In the normal rest position the pivot pin 28 secured at the fitting 23 which includes or contains the pivot pin 24 of the hook 25 abuts on a ring 29 which is mounted on the clamping bolt 20 and thus prevents a pivoting back of the backrest 3. The pin 28 takes over at the same time the task of the support 16 according to FIG. 1.

It can be seen from FIG. 5 in which the hook 25 is illustrated in side view, that the hook 25 is provided at its upper end with two abutments 30 and 31. A pin 32 secured at the fitting 23 is disposed between the abutments 30 and 31; the spiral spring 26 is placed at the same time about the pin 32. In the unlocked condition — with forward pivoted backrest — the hook 25 is forced by the spiral spring 26 with its abutment 30 against the pin 32 secured in the fitting 23. In that case the inclined abutment surface 33 of the nose portion 27 of the hook 25 lies above the clamping bolt 20. The abutment 31 has the purpose to prevent that the hook 21 is pulled too high with the aid of the Bowden cable 34.

FIG. 6 also illustrates that the fitting 23 is slightly beveled off at its lower end as indicated by reference numeral 23', in order that it can be forced easily over the conical extension 21 of the clamping bolt 20. A conventional spring serves as armoring means 35 which is to prevent that the fitting will be worn by the friction exerted thereon by the clamping bolt 20, 21.

While I have shown and described only two embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. An installation for locking the backrest of seats of vehicles comprising fitting means for directly supporting a backrest, pivot connection means for pivotally connecting said fitting means at a relatively fixed seat frame such that said fitting means and associated backrest can be pivoted from a rearwardly pivoted position to a forwardly pivoted position with respect to the seat frame, relatively fixed abutment means, and disengageable locking means for preventing forward tilting of the backrest during driving of the vehicle, said locking means including resilient clamping means arranged at said fitting means for resiliently holding the backrest in the rearwardly pivoted position and hook means mounted about a pivot pin secured at the fitting means, said hook means being engageable with said abutment means after a slight movement of the backrest away from the rearwardly pivoted position to preclude further pivotal movement of the backrest against the resilient force of the clamping means, wherein said clamping means comprises a curved bending spring with several leg portions which is so arranged about the pivot pin and about a further support means also secured at the fitting means that during locking in the driving condition a leg portion of the spring engages the abutment means wedge shaped from below whereas another leg portion of the spring forces an inner flank of the hook against the abutment means.

2. An installation according to claim 1, characterized in that said one leg portion of the spring has a considerably larger spring constant than the other leg portion secured at the hook means.

3. An installation according to claim 2, characterized in that said hook means is substantially angularly shaped.

4. An installation according to claim 2, characterized in that said hook means is curved.

5. An installation according to claim 2, characterized in that said one leg portion of the spring is turned-in at its free end and is provided with two abutment surfaces disposed at an approximately right angle to one another.

6. An installation according to claim 5, characterized in that the other leg portion of said spring is bent at its end connected with the hook means approximately in the shape of a hairpin and serves as return spring for the hook means.

7. An installation according to claim 6, characterized in that the abutment means is formed by a pin member fixedly arranged at the seat frame.

8. An installation according to claim 7, characterized in that the clamping means are arranged at the inner side of the seat fitting means.

9. An installation according to claim 6, characterized in that a backrest support means secured at the fitting means abuts at the abutment means.

10. An installation according to claim 9, characterized in that said support means is formed by an abutment for the spring.

11. An installation for locking the backrest of seats of vehicles comprising fitting means for directly supporting a backrest, pivot connection means for pivotally connecting said fitting means at a relatively fixed seat frame such that said fitting means and associated backrest can be pivoted from a rearwardly pivoted position to a forwardly pivoted position with respect to the seat frame, relatively fixed abutment means, disengageable locking means for preventing forward tilting of the backrest during driving of the vehicle, said locking means including resilient clamping means arranged at said fitting means for resiliently holding the backrest in the rearwardly pivoted position and hook means mounted about a pivot pin secured at the fitting means, said hook means being engageable with said abutment means after a slight movement of the backrest away from the rearwardly pivoted position to preclude further pivotal movement of the backrest against the resilient force of the clamping means, and disengaging means for releasing said locking means to permit unrestricted forward pivotal movement of said backrest about said pivot connection means.

12. An installation according to claim 11, wherein said pivot connection means is arranged forwardly of said abutment means.

13. An installation according to claim 12, wherein said hook means includes a forwardly and upwardly open portion for engaging with rearwardly and downwardly facing portions of said abutment means.

14. An installation according to claim 11, wherein said resilient clamping means engages directly at said abutment means at a position spaced from the engaging point of said hook means.

15. An installation according to claim 11, characterized in that the abutment means is formed by a pin member fixedly arranged at the seat frame.

16. An installation according to claim 2, characterized in that the clamping means are arranged at the inner side of the seat fitting means.

17. An installation according to claim 11, characterized in that said clamping means includes a clamping bolt means fixedly arranged at the seat frame which is provided at its end opposite the seat frame with an approximately conically-shaped extension and engages partially into an aperture provided in the fitting means, said clamping bolt means also forming said abutment means.

18. An installation according to claim 17, characterized in that said clamping bolt means is adjustable in its longitudinal axis.

19. An installation according to claim 18, characterized in that said aperture is armored.

20. An installation according to claim 19, characterized in that a spiral spring means is arranged at the pivot pin which extends over the hook means and forces the same with its inner flank against the clamping bolt means.

21. An installation according to claim 20, characterized in that a backrest support means secured at the fitting means abuts at the abutment means.

22. An installation according to claim 21, characterized in that the support means is formed by the pivot pin of said hook means and abuts against a ring mounted on the clamping bolt means.

23. An installation according to claim 11, characterized in that the hook means is provided at its end opposite the pivot pin with a nose portion partially surrounding the abutment means, said nose portion being provided with an external inclined abutment surface and being retained at a predetermined distance below the abutment means during locking in the driving condition.

24. An installation according to claim 23, characterized in that upon exceeding the spring force of the clamping means by a load on the backrest in the driving direction, the nose portion of the hook means engages under the abutment means.

25. An installation according to claim 24, characterized in that an unlocking actuating means engages approximately at the outer flank of the hook means which is actuatable near the upper end of the backrest and which pivots the hook means against the spring force of a spring in the outward direction.

26. An installation according to claim 1, wherein the hook means is provided at its end opposite the pivot pin with a nose portion partially surrounding the abutment means, said nose portion being provided with an external inclined abutment surface and being retained at a predetermined distance below the abutment means during the driving condition, said nose portion being engageable with the abutment means upon said slight movement of the backrest away from the rearwardly pivoted position, wherein an unlocking actuating means is provided which engages approximately at an outer flank of the hook means, said unlocking actuating means being operable from near the upper end of the backrest for pivoting the hook means against the spring force of a spring in the outward direction, and wherein said actuating means includes a Bowden cable actuatable by means of a lever.

27. An installation according to claim 26, characterized in that said one leg portion of the spring is turned-in at its free end and is provided with two abutment surfaces disposed at an approximately right angle to one another.

28. An installation according to claim 26, characterized in that the other leg portion of said spring is bent at its end connected with the hook means approximately in the shape of a hairpin and serves as return spring for the hook means.

29. An installation according to claim 26, characterized in that the hook means is pivoted outwardly against the spring force of the return spring.

30. An installation according to claim 25, characterized in that said clamping means includes a clamping bolt means fixedly arranged at a seat frame which is provided at its end opposite the seat frame with an approximately conically-shaped extension and engages partially into an aperture provided in the fitting means, said clamping bolt means also forming said abutment means.

31. An installation according to claim 30, characterized in that a spiral spring means is arranged at the pivot pin which extends over the hook means and forces the same with its inner flank against the clamping bolt means.

32. An installation according to claim 31, characterized in that the hook means is pivoted outwardly against the spring force of the spiral spring means.

33. An installation according to claim 25, characterized in that the pivoting movement of the hook means is limited by stop means so that the external abutment surface of the nose portion on said hook means is disposed above the abutment means in the unlocked condition of the backrest.

34. An installation according to claim 33, characterized in that the pivotal movement of the hook means is limited in both directions of pivot movement.

35. An installation according to claim 34, characterized in that one stop means absorbs the spring force of the spring in the unlocked condition of the backrest.

36. An installation according to claim 11, characterized in that a backrest support means secured at the fitting means abuts at the abutment means.

37. An installation according to claim 11, characterized in that the pivoting movement of the hook means is limited by stop means so that the external abutment surface of the nose portion on said hook means is disposed above the abutment means in the unlocked condition of the backrest.

38. An installation according to claim 37, characterized in that the pivotal movement of the hook means is limited in both directions of pivot movement.

39. An installation according to claim 37, characterized in that one stop means absorbs the spring force of the spring in the unlocked condition of the backrest.

* * * * *